THERMOELECTRIC HEAT-PUMPS

Original Filed May 1, 1953 2 Sheets-Sheet 1

INVENTOR.
Nils E. Lindenblad
BY Morris A. Rabkin
ATTORNEY.

INVENTOR.
Nils E. Lindenblad
BY Morris A. Rabkin
ATTORNEY.

United States Patent Office 2,884,762

Patented May 5, 1959

2,884,762

THERMOELECTRIC HEAT-PUMPS

Nils E. Lindenblad, Princeton, N.J., assignor to Radio Corporation of America, a corporation of Delaware Original application May 1, 1953, Serial No. 352,473, now Patent No. 2,734,344, dated February 14, 1956. Divided and this application December 1, 1955, Serial No. 550,438

10 Claims. (Cl. 62—3)

The present invention relates to thermoelectric heat-pumps, and more particularly to novel structural arrangements for producing cooling by means of the Peltier effect, the present application being a division of my copending application, Serial No. 352,473, filed May 1, 1953, now Patent No. 2,734,344, issued February 14, 1956.

In order to make the Peltier effect available for the production of cold, a thermo-pile comprising bi-metallic elements, such, for example, as bismuth and antimony or other similarly acting metals having different thermo-electric powers, arranged alternately is usually provided. The bi-metallic element or thermocouple normally has two discrete portions, namely, a cold portion and a hot portion. The cooling effect produced in a circuit at the junction of the two electrically conductive metals upon the application of a current thereto is proportional to the current crossing the bi-metallic boundary.

A novel cascaded thermoelectric pile cooling apparatus or heat-pump constructed in accordance with the present invention may comprise a plurality of concentric, or linear banks of thermocouples disposed and secured in thermal contact with each other. The cold ends of the thermocouples constituting each bank are disposed in the direction of the area to be cooled. The individual couples are physically arranged so that their number increases successively between adjacent banks along the path of heat transport away from the cool area. Thus, the bank nearest the cool area will have the fewest number of thermocouples. The purpose of this arrangement is to remove the extra heat produced by ohmic losses in each bank or stage. The thermal bond between banks has a high thermal conductivity and a low electric conductivity. Heat is thus carried away from the cool area progressively by means of the successively increasing numbers of thermocouples. The area to be cooled thus has its temperature gradually but effectively lowered.

An object of the present invention is to provide an arrangement for cascading the members of a multi-couple thermoelectric pile so as to multiply the temperature difference obtained with a single pile.

It is another object of the present invention to provide an improved panel structure for a thermoelectric heat pump.

It is still another object of the present invention to provide an improved structure for a thermoelectric heat pump having cascaded banks of thermocouples.

It is a further object of the invention to provide a completely electric cooling system in which there are no conventional moving parts and in which a minimum of electric current is required.

Other objects and advantages of the present invention will, of course, become apparent and immediately suggest themselves to those skilled in the art to which the invention is directed from a reading of the following description in connection with the accompanying drawings in which.

Figures 3, 3A:
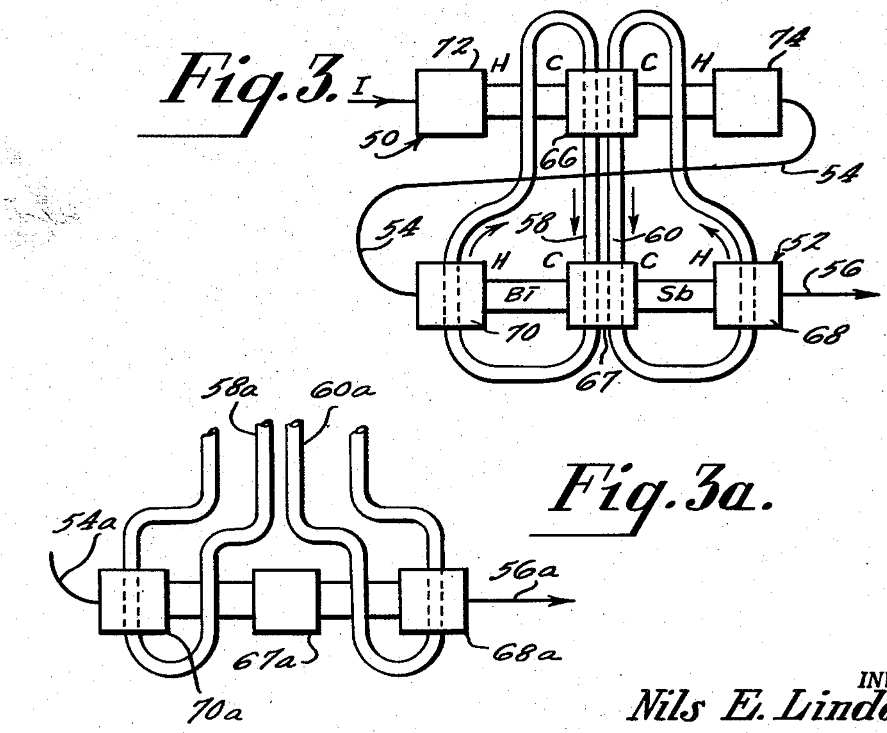
Fig. 3 is a schematic diagram of a thermocouple cooling arrangement in accordance with this invention and illustrating a conduit system for use therewith.
Figure 4:
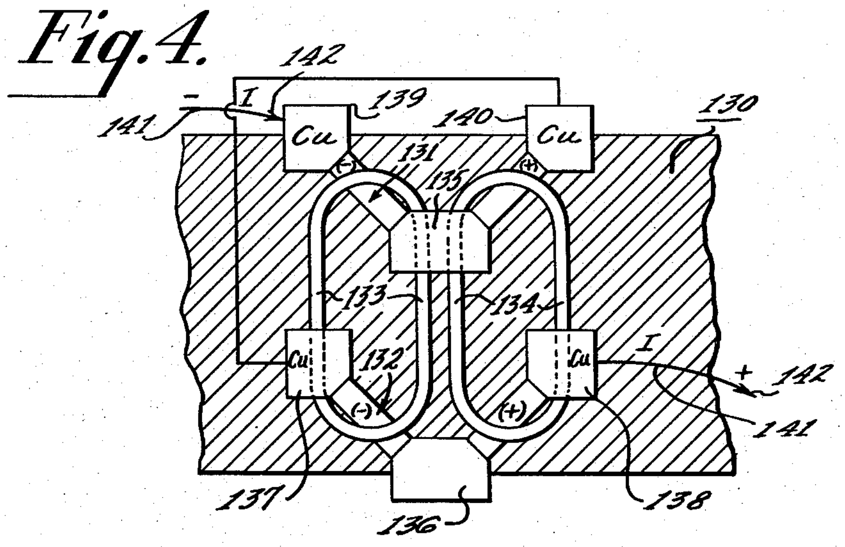
Figure 5:
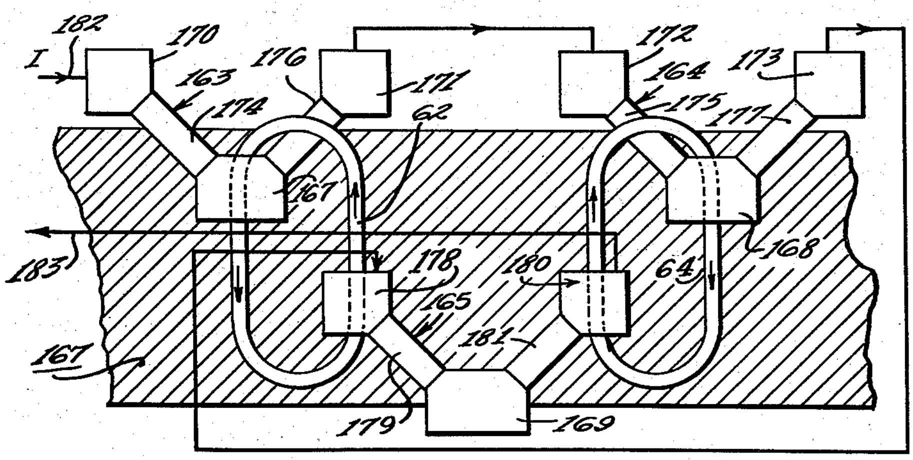

Fig. 3*a* is a fragmentary view showing a modified portion of the arrangement of Fig. 3;

Fig. 4 is a schematic diagram partially in section of one application of the present invention to interior cooling;

Fig. 5 is a schematic diagram partially in section illustrating another application of the invention to interior cooling.

If a current of electricity is caused to flow across the conducitve junction of two dissimilar metals, there is either an evolution or an absorption of heat at the junction. This result stems from the fact that the two metals are at different potentials resulting from a difference in the free electron density so that an exchange of heat into work or vice versa results when the current flows from one metal to another. This may be likened to expansion and compression in the case of a gas.

Figure 1:
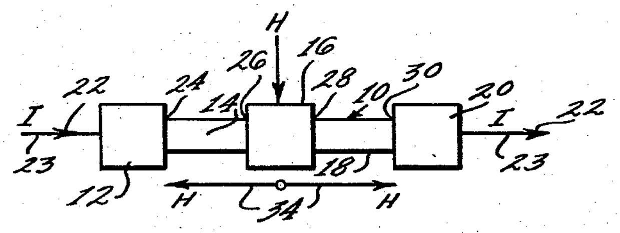
Fig. 1 is a schematic representation of a thermocouple having features of the invention and illustrating the direction of heat flow therethrough.

Referring to Fig. 1, there is shown a schematic representation of a cooling apparatus comprising a thermocouple 10 in which alternate members of copper 12, bismuch 14, copper 16, antimony 18 and copper 20, respectively, are conductively joined to form a unitary structure. If a current (I) is sent through the copper member 12 in the direction indicated by the arrowheads 22 on the supply conductor 23, the junction 24 of the copper and the bismuth 14 will become heated while the adjacent junction 26 between the bismuth 14 and the copper 16 will become cooled. Progressing in the righthand direction in the illustrative embodiment shown, the junction 28 between the copper 16 and antimony 18 will become cooled while the furthermost antimony 18 and copper 16 junction 30 will become heated. Thus it may be seen that a predetermined amount of heat admitted to the center copper electrode will be dissipated by this cooling effect and the heat energy will be carried toward either end member 12 or 20 of the thermocouple as shown by the arrows 34.

Figure 2:
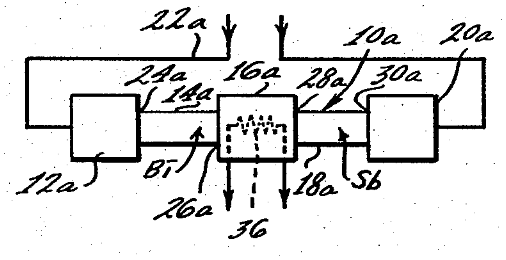
Fig. 2 is a schematic diagram of a thermocouple similar to that shown in Fig. 1.

Fig. 2 is a schematic representation of the thermocouple device of Fig. 1 useful for producing cooling of heated bodies. In this case a heater wire 36 has been added to the cold junction element 16 to enable measuring the cooling capacity of a thermocouple operating as indicated in Fig. 1.

Fig. 3 represents a schematic illustration of a serially additive thermoelectric pile incorporating features of the present invention. In this instance, for example, two bismuth-antimony thermocouples 50 and 52 are arranged so that the cooling effect derived from both thermocouples may be added together to produce a greater temperature change. The horizontal arrows 54 and 56, as viewed on the drawing, illustrate the direction of the current (I) applied to the device. Two cool flow conduits 58 and 60, adapted to contain a heat transfer gas or liquid, are or may be, disposed in thermally conductive contact with the cold copper junctions 66 and 67. The conduits may take the form of pipes which pass through holes provided in the junctions 66 and 67. The conduits may be fabricated of glass in which case each portion of the two glass conduits could be sealed to a respective hole in the junctions 66 and 67 so that greater thermal conductivity is provided at the two junctions. Other material of high electrical resistivity, such for example, as stainless steel may be used to form two continuous conduits. The stainless steel conduit provides better thermal conductivity than glass and thereby offers a better cooling arrangement. The portion of the cooling produced by the cold center junction electrodes 66 and 67 of the two thermocouples can thus be conducted circuitously back along with the heat from the hot outer junction electrodes 68 and 70 to the cold copper portion 66 of the first thermocouple 50 to be further cooled thereby. Thus only two of the hot portions 72 and 74 are exposed to the ambient temperature.

The arrangement of Fig. 3*a* provides an alternative path for the conduits 58*a* and 60*a*. The cold junction 67*a* is effectively by-passed.

The arrangements of the thermocouples illustrated by Figs. 3 and 3*a* may be adapted for improved thermoelectric heat pumps having panel structures. Such improved structures provide thermal insulation between hot junctions in successive thermocouple banks and thereby have higher efficiency than known forms of serially additive thermoelectric piles, moreover, the improved structures provided by the present invention lend themselves for direct installation in the walls of buildings or any flat surface to be cooled or heated by thermoelectric action.

Fig. 4 is a schematic diagram partially in section of an application of the present invention to interior cooling. For purposes of illustration only, the embodiment set forth shows a section through a panel or wall 130 of a building (not shown). Two thermocouples 131 and 132 are disposed in the panel 130. The thickness of the panel 130 is immaterial and may vary with specific applications. The thermocouple 131 may be a member of an outer bank of thermocouples and the thermocouple 132 may be a member of an inner bank of thermocouples. Two continuous cool flow conduits 133 and 134, adapted to contain a heat transfer fluid, gas or liquid, are disposed in thermal contact with the two thermocouples. The conduits 133 and 134 are or may be pipes which pass through holes provided in the copper members 135 and 136 and likewise in the copper members 137 and 138. Two other copper members 139 and 140 are exposed to the outside atmosphere and are adapted to extend through the wall 130. The copper member 136 is disposed to extend through the interior portion of the wall 130. Cooling is thus delivered to the interior portion of the associated building when current of a proper polarity is applied to the thermocouples 131 and 132 over thhe conductors 141 in the direction indicated by the arrowheads 142.

In order to provide greater heat transfer, the device of Fig. 5 may be used. Three thermocouples 163, 164 and 165 similar in structure to the thermocouples of Fig. 4 and comprised of the same metallic elements as the couples of Fig. 4 are disposed in a panel or wall 166 of a building (not shown). Two cool flow conduits or pipes 62 and 64 similar to the cool flow conduits of Fig. 4 are adapted to pass through holes provided in the cold junction 167, 168 and the hot junctions 178 and 180. Since the heat from the hot junctions 178 and 180 tends to rise, the conduits 62 and 64 can carry the heat to the cold junctions 167 and 168. Added cooling is thus provided for the cold junction 169. The copper members 170, 171, 172 and 173 are adapted to protrude externally of the panel 166, into the outside atmosphere. The bismuth members 174 and 175 connect the members 170 and 172 to the cold junction 167 and 168, respectively. The antimony members 176 and 177 connect the copper members 171 and 173 to the cold junction 167 and 168, respectively. The copper member 178 is joined to the cold junction 169 by means of a bismuth member 179. The copper member 180 is joined to the cold junction 169 by means of the antimony member 181. Current (I) is or may be applied to the member 170 over the conductors 182 and 183. The conductors 182 and 183 are adapted to serially connect the members 170, 171, 172, 173, 178 and 180. The cold junction 169 is disposed to protrude or extend through the wall 166 into the inside of the building thereby to provide means for providing cooling.

The hot junctions 178, 180 of the couple 165 in the thermocouple bank in the side of the panel 167 nearest to the inside of the building give off heat to the cool junctions 167, 168 of each one of the couples 163, 164 in the bank of thermocouples in the outer side of the panel 167. This latter bank can absorb the heat thus dissipated effectively by virtue of its greater number of thermocouples. In this way a gradient and a heat flow is established. Each thermocouple bank will produce its share of the total temperature difference and the mean temperature between the cool junctions and the hot junctions in any bank will be that corresponding to its location in the total gradient pattern. Since the hot junctions of the couples in the outer bank are exposed outside the building, they can be kept near ambient temperature. The cool end will then drop below ambient to the extent determined by the thermocouple material, the electron current and the number of stages or cascaded banks of thermocouples.

There has thus been described a novel temperature cascaded thermoelectric pile and heat-pump in which the temperature drop obtained in a single bank of thermocouples may be multiplied repeatedly to produce effective cooling.

What is claimed is:

1. A thermoelectric heat-pump comprising a first thermocouple having a cold junction and a hot junction, said hot junction being disposed in heat exchange relationship with the ambient, a second thermocouple having a hot junction and a cold junction, said cold junction of said second thermocouple being arranged to be disposed in heat exchange relationship with a medium to be cooled, means for supporting said first and said second thermocouples in thermally isolated relationship, a flowable heat exchange medium, and means for coupling said hot junction of said second thermocouple to said cold junction of said first thermocouple in heat exchange relationship with each other through said heat exchange medium.

2. A thermoelectric heat-pump, according to claim 1, wherein said last named means includes a closed loop conduit through which said heat transfer medium circulates.

3. A thermoelectric heat-pump comprising a first thermocouple having a cold junction and a hot junction, said hot junction being disposed in heat exchange relationship with the ambient, a second thermocouple having a hot junction and a cold junction, said cold junction of said second thermocouple being arranged to be disposed in heat exchange relationship with a medium to be cooled, said first thermocouple and said second thermocouple being disposed away from each other in thermally isolated relationship, and a conduit providing means for thermally coupling said hot junction of said second thermocouple to said cold junction of said first thermocouple whereby said cold junction of said first thermocouple absorbs heat generated in said hot junction of said second thermocouple.

4. A thermoelectric heat-pump comprising a panel of thermally insulating material, a first thermocouple having a cold junction and a hot junction disposed in one side of said panel, said hot junction extending out of said one side of said panel, a second thermocouple having a hot junction and a cold junction disposed in the other side of said panel, said cold junction of said second thermocouple extending out of said other side of said panel thereby being adapted to be disposed in heat exchange relationship with a medium to be cooled, a heat exchange medium, and a conduit filled with said medium for coupling said hot junction of said second thermocouple to said cold junction of said first thermocouple in heat exchange relationship with each other.

5. A thermoelectric heat-pump comprising at least two cascaded banks of thermocouples, said banks of thermocouples being supported in thermally isolated relationship one from the other, said thermocouples in said banks having alternately disposed hot and cold junctions, said hot junctions of the thermocouples in said one bank being disposed in heat exchange relationship with the ambient, said cold junctions of the thermocouples in said other bank being arranged to be disposed in heat exchange relationship with a medium to be cooled, a heat transfer medium having properties of convective circulation, and means providing for the convective circulation of said medium for coupling said cold junctions of the thermocouples in said one bank in heat exchange relationship with said hot junctions of the thermocouples in said other bank through said medium whereby heat exchange is effected through the circulation of said medium.

6. A thermoelectric heat-pump comprising two cascaded banks of thermocouples, said banks of thermocouples being disposed thermally in thermal isolation one from the other, said thermocouples in said banks having alternately disposed hot and cold junctions, said hot junctions of the thermocouples in said one bank being disposed in heat exchange relationship with the ambient, said cold junctions of the thermocouples in said other bank being arranged to be disposed in heat exchange relationship with a medium to be cooled, a heat transfer medium having properties of convective circulation, and a plurality of loop conduits filled with said medium for coupling said cold junctions of the thermocouples in said one bank in heat exchange relationship with said hot junctions of the thermocouples in said other bank through said medium, said conduits being individually disposed in heat exchange relationship with different ones of said hot junctions of the thermocouples in said other bank and with the cold junctions of the thermocouples in said one bank.

7. A thermoelectric heat-pump comprising two cascaded banks of thermocouples, said banks of thermocouples being spaced from each other for thermal isolation one from the other, said thermocouples in said banks being provided with junctions of solid conductive material, alternately disposed ones of said junctions being hot and cold junctions, said hot junctions of the thermocoupled in said one bank being disposed in heat exchange relationship with the ambient, said cold junctions of said thermocouples in said one bank having holes extending therethrough, said cold junctions of the thermocouples in said other bank being arranged to be disposed in heat exchange relationship with a medium to be cooled, said hot junctions of said thermocouples in said other bank having holes extending therethrough, a heat transfer medium having properties of convective circulation, and a plurality of conduits formed of thermal insulating material having higher electrical resistivity than said thermocouples, each of said conduits individually interconnecting the ends of said holes in said hot junctions of the thermocouples in said other bank with said cold junctions of the thermocouples in said one bank, said conduits being filled with said medium.

8. A thermoelectric heat-pump for cooling the interior of a chamber defined by a wall structure comprising at least two banks of thermocouples arranged in at least a portion of said wall structure, said thermocouples being provided with hot and cold junctions, one of said banks being disposed near the exterior surface of said wall with said hot junctions of the thermocouples therein extending outside said wall and being exposed outside said chamber, the other of said banks being disposed near the interior surface of said wall with said cold junction of the thermocouples therein extending into said chamber, heat transfer means for thermally coupling said hot junctions of the thermocouples in said other bank to the cold junctions of the thermocouples in said one bank, said means comprising a heat transfer medium, and means for individually coupling different ones of said hot junctions in said other bank to cold junctions in said one bank in heat exchange relationship through said medium.

9. A thermoelectric heat-pump, according to claim 8, wherein said last named means are a plurality of loop conduits.

10. A thermoelectric heat pump comprising a first thermocouple having a cold junction and a hot junction, a second thermocouple having a hot junction and a cold junction, said cold junction of said second thermocouple being disposed in heat exchange relationship with a medium to be cooled, means for maintaining said first thermocouple and said second thermocouple in thermal isolation from each other, and heat exchange means for coupling said hot junction of said second thermocouple and said cold junction of said first thermocouple in heat exchange relationship with each other, said last-named means comprising a flowable heat exchange medium, and means for communicating said heat exchange medium with said hot junction of said second thermocouple and said cold junction of said first thermocouple.

References Cited in the file of this patent

UNITED STATES PATENTS

| | | |
|---|---|---|
| 420,641 | Dewey | Feb. 4, 1890 |
| 1,120,781 | Altenkirch et al. | Dec. 15, 1914 |
| 2,729,949 | Lindenblad | Jan. 10, 1956 |